(12) United States Patent
Garde

(10) Patent No.: US 6,513,125 B1
(45) Date of Patent: Jan. 28, 2003

(54) MULTI-PHASE MULTI-ACCESS PIPELINE MEMORY SYSTEM IN WHICH THE PIPELINE MEMORY CAN DECODE ADDRESSES ISSUED BY ONE PROCESSOR WHILE SIMULTANEOUSLY ACCESSING MEMORY ARRAY BY OTHER PROCESSOR

(75) Inventor: Douglas Garde, Dover, DE (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 08/779,272

(22) Filed: Jan. 6, 1997

Related U.S. Application Data

(63) Continuation of application No. 08/417,660, filed on Apr. 5, 1995, now abandoned, which is a division of application No. 08/215,508, filed on Mar. 22, 1994, now abandoned, which is a continuation-in-part of application No. 08/052,073, filed on Apr. 23, 1993, now Pat. No. 5,471,607.

(51) Int. Cl.[7] .................................................. G06F 1/04
(52) U.S. Cl. ........................ 713/500; 711/100; 713/501
(58) Field of Search ................................. 395/674, 427, 395/555, 556; 709/104; 710/107; 711/100; 713/500, 501; 714/45

(56) References Cited

U.S. PATENT DOCUMENTS 3,702,989 A * 11/1972 Provenazno et al. .......... 714/45
4,392,200 A * 7/1983 Arulpragasam et al. .... 364/200
4,654,788 A * 3/1987 Boudreau et al. ............ 710/107
5,010,476 A * 4/1991 Davis ..................... 364/DIG. 1
5,297,267 A * 3/1994 Inoue .......................... 395/425

FOREIGN PATENT DOCUMENTS

JP          64-43894          2/1989

OTHER PUBLICATIONS

"CPC (Cycle Pipeline Computer)— An Architecture Suited for Josephson and Pipelined—Memory Machines", by Shimizu, K. et al, IEEE Transactions on Computers, Jun. 1989.*

* cited by examiner

Primary Examiner—Thomas Lee
Assistant Examiner—Thuan Du
(74) Attorney, Agent, or Firm—Iandiorio & Teska; R. Stephen Rosenholm; Kirk Teska

(57) ABSTRACT

A multi-phase, multi-access pipeline memory system includes a number, n, of processors; a pipeline memory including a latch; and a bus for interconnecting the processors and pipeline memory; a clock circuit responsive to a system clock signal divides the system clock signal into n phases for providing multiple clock signals corresponding to the n phases of the system clock signal for application to each processor to allow data and address to be transferred only during its assigned phase thereby enabling the memory and each processor to operate at the system clock rate while allowing n accesses to the memory during each system clock signal period, one access for each processor.

3 Claims, 8 Drawing Sheets

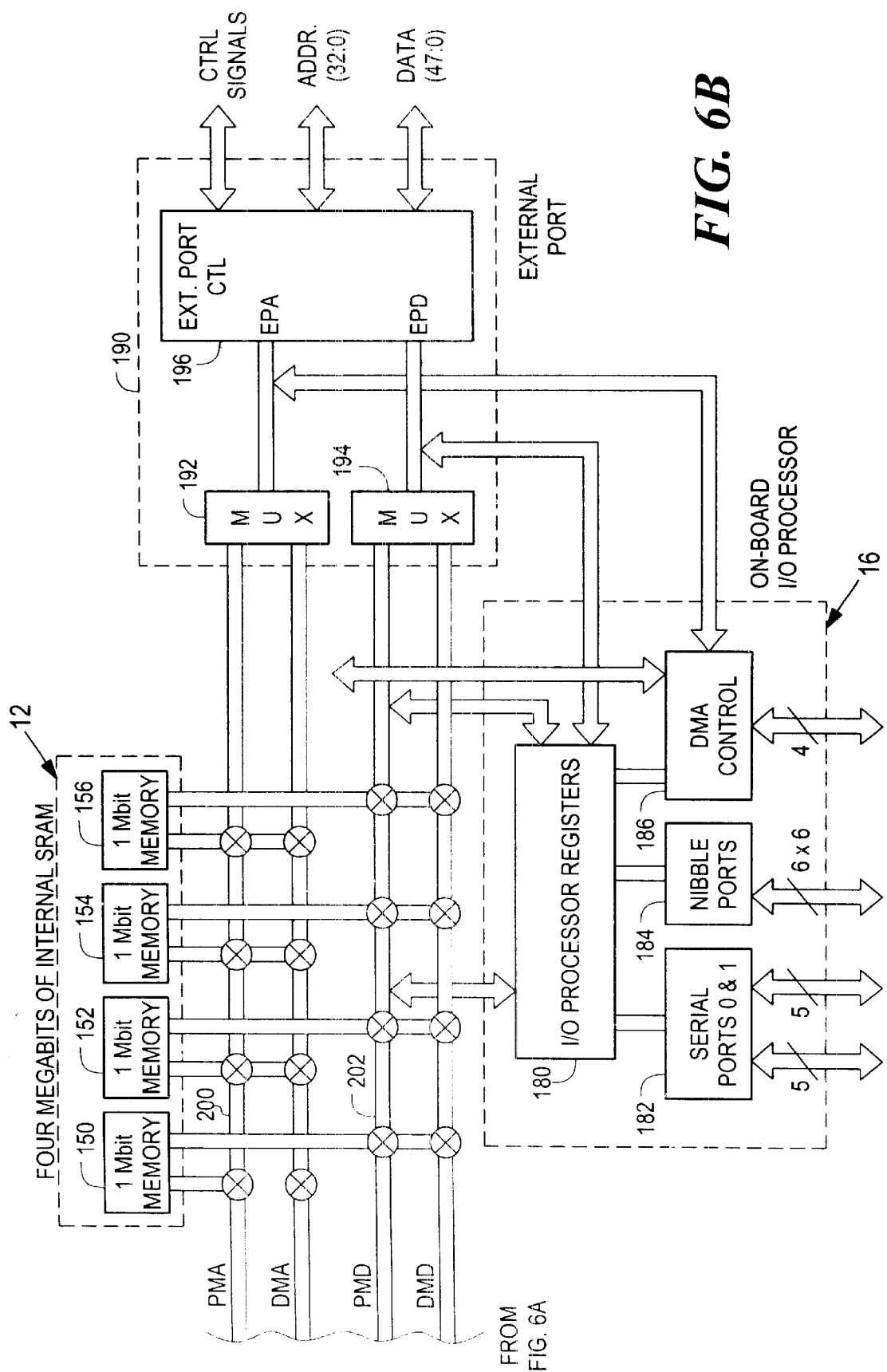

MULTI-PHASE MULTI-ACCESS PIPELINE MEMORY SYSTEM IN WHICH THE PIPELINE MEMORY CAN DECODE ADDRESSES ISSUED BY ONE PROCESSOR WHILE SIMULTANEOUSLY ACCESSING MEMORY ARRAY BY OTHER PROCESSOR

RELATED INVENTIONS

This application is a continuation-in-part application of U.S. Ser. No. 08/052,073, now U.S. Pat. No. 5,471,607 entitled "Multi-phase Multi-Access Pipeline Memory System" by the same inventor, filed Apr. 23, 1993. This is a continuation of Ser. No. 08/417,660, filed Apr. 5, 1995, now abandoned. Which is a division, of application Ser. No. 08/215,508, now abandoned, filed March 22, 1994, which is a Continuation-in-Part of application Ser. No. 08/052,073, now U.S. Pat. No. 5,471,607, filed Apr. 23, 1993.

BACKGROUND OF INVENTION

1. Field of the Invention

This invention relates to a multi-phase multi-access pipeline memory system.

2. Description of the Prior Art

In conventional computers and microcomputers there is a constant contention between the microprocessor and the I/O processor for memory access. This is a particularly serious problem in signal processing applications requiring high speed processing of massive amounts of data and high I/O rates. There are four approaches commonly used to enable fair sharing of the memory. One is to use dual port memories: these are generally complex and expensive and have small capacity. A second approach uses "cycle stealing" wherein one of the microprocessor and I/O processor has priority over the other and "steals" memory access when it needs it, thereby interrupting the operation of the other. This slows down the response of the interrupted processor and of the whole system. The third approach uses a number of separate memory banks so that most of the time each of the microprocessor and I/O processor can be accessing a different bank. In order to effect his, however, the user/programmer must superimpose on the programming the goal of minimizing overlap in access demand for the memory banks by the microprocessor and I/O processor. This requires careful scheduling of the I/O and computing tasks so that simultaneous demand by both processors for the same memory bank is avoided or at least reduced. That imposes a burdensome ancillary constraint on the user. The fourth approach is to simply run the memory at twice the normal cycle speed. But this is difficult, especially in signal processing systems where memories are already operating at near capacity as a rule.

Also, even in a single processor design, there may be the need to issue two instructions and receive two data valves per system clock cycle or, one or more processors could be operating in this way while other processors in the system may issue only one instruction and receive one data value per clock cycle. In any case, the same shortcomings in the prior art are present with these designs.

SUMMARY OF INVENTION

It is therefore an object of this invention to provide an improved, multi-phase multi-access pipeline memory system.

It is a further object of this invention to provide such a multi-phase multi-access pipeline memory system which does not increase, expand or limit memory capacity.

It is a further object of this invention to provide such a multi-phase, multi-access pipeline memory system which does not interrupt other processors' access to the memory and does not slow down the system operation as a whole.

It is a further object of this invention to provide such a multi-phase, multi-access pipeline memory system which requires no special programming or scheduling of processor-memory interaction.

It is a further object of this invention to provide such a multi-phase, multi-access pipeline memory system which does not require operating the memory above normal speeds.

It is a further object of this invention to provide such a multi-phase, multi-access pipeline memory system for implementing instructions or data caches.

The invention results from the realization that a truly effective multi-access memory system can be achieved in which each processor has access to the memory once in each system clock period without interfering with the access of the other processors by phase shifting the memory access of the processors and pipelining the memory so that each processor accesses memory during a different phase of the system clock period while maintaining the memory operation at its normal speed. Underlying this approach is the fundamental realization that in most cases there is no reason why all the processors, be they microprocessors or I/O processors, must access memory in phase so that their accesses start and end simultaneously: an overlapped sequence of access is acceptable and therefore pipelined memory in combination with phase overlapped sequencing can be used to full advantage. Also, it was realized that such a dual access, dual phase memory system may be used to implement instructions or data caches.

This invention features a dual phase, dual access pipeline memory system having first and second processors, a pipeline memory including latch means, and a bus means for interconnecting the processor to the pipeline memory. There is a clock circuit responsive to a system clock signal for providing a first clock signal in phase with the system clock signal for operating the access of the first processor, a second clock signal out of phase with the system clock signal for operating the access of the second processor out of phase with the first processor, and a third clock signal at twice the system clock signal rate for clocking the pipeline memory through the latch means to allow an address to be supplied to the pipeline memory by the first processor while accessing data from the address supplied in the previous cycle during one phase. Conversely, it allows an address to be supplied to the pipeline memory by the second processor while accessing data from the address supplied in the previous cycle during the other phase.

In the preferred embodiment the processors may include an I/O processor and a microprocessor, or the processors may be both microprocessors. The processors may also include subprocessors in the same microprocessor. The subprocessors may include an instruction fetch unit and a data fetch unit. The pipeline memory may include a plurality of memory banks and the bus means may include a plurality of data address bus pairs and there may be third and fourth processors. The first and third processors may include data fetch units which access different memory banks from each other in the same phase with each other and the second and fourth processors may include an instruction fetch unit and an I/O processor which access different memory banks from each other in the same phase with each other but out of phase with the first and third processors.

In a more comprehensive sense, the invention features a multi-phase, multi-access pipeline memory system which includes a number, n, of processors, a pipeline memory including latch means, and bus means interconnecting the processors and pipeline memory. There is a clock circuit responsive to a system clock signal for dividing the system clock signal into n phases for providing multiple clock signals corresponding to the n phases of the system clock signal for operating the access of each processor to allow data and addresses to be transferred only during the assigned phase, thereby enabling the memory and each processor to operate at the system clock rate while allowing n accesses to the memory during each system clock signal period, one access for each processor.

In a preferred embodiment at least one of the processors may be an I/O processor and one may be a microprocessor, or the processors may both be microprocessors. The processors may include subprocessors in the same microprocessor. The subprocessors may include a data fetch unit and an instruction fetch unit. The latch means may include a plurality of latches to enable pipelining of n accesses of the pipeline memory during each system clock signal period.

SUMMARY OF INVENTION

This invention also features a dual-phase, dual-access pipeline memory system comprising processor means, a pipeline memory including latch means bus means for interconnecting the processor means and the pipeline memory. A clock circuit, responsive to a system clock cycle, provides the first clock signal in phase with the system clock signal, and a second clock signal out of phase with the system clock signal, and the third clock signal with twice the system clock signal rate for clocking the pipeline memory through the latch means to allow an address to be supplied to the pipeline memory by the processor means during one phase while the processor means is accessing data from the previous cycle in the same phase, and conversely to allow another address to be supplied to the pipeline memory by the processor means during the other phase while the processor means is accessing data from the previous cycle in the same phase. The processor means may include a single processor issuing first and second instructions to the memory and receiving first and second data values from the memory for a system clock cycle. Alternatively, the processor means may include first and second processors and the first clock signal accesses the first processor and the second clock signal accesses the second processor out of phase with the first processor.

In a more comprehensive sense, the invention features a multi-phase, multi-access pipeline memory system comprising a number of processors which issue two instructions and receive two data values per system clock cycle and a number of different types of processors which only issue one instruction and receive one data value per system clock cycle. This divides the system clock signal into two phases per each first type of processor, and one phase for each second type of processor and one phase for each second type of processor. Instead of dividing the clock cycle into more phases, other processor can share the memory by cycle stealing.

This invention also features a method of operating two processors which access the pipeline memory by dividing the clock cycle into two phases, operating the first processor to issue instructions to the memory during one phase and to receive data in the same phase, and operating the second processor to issue an instruction to the memory during the second phase. For the single processor embodiment, the method includes dividing the clock cycle into two phases and operating the processor to issue an instruction during the first phase and to issue an instruction during the second phase, and operating the processor to receive data from the memory during the first phase and to receive data from the memory in the second phase.

DESCRIPTION OF PREFERRED EMBODIMENT

Other objects, features and advantages will occur to those skilled in the art from the following description of a preferred embodiment and the accompanying drawings.

Figure 1:
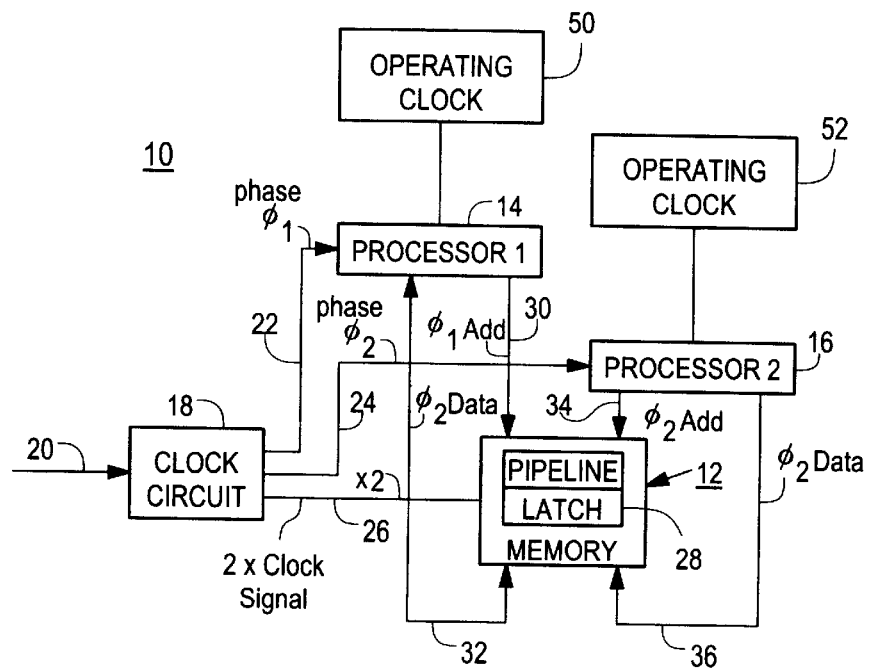
FIG. 1 simplified block diagram of a multi-phase, multi-access pipeline memory system according to this invention.

There is shown in FIG. 1 a multi-phase, multi-access pipeline memory system 10 according to this invention including a pipeline memory 12 and two processors 14 and 16, along with clock circuit 18 which is driven by a system clock signal that it receives on line 20. Clock circuit 18 divides the system clock signal into two phases: $\phi_1$ delivered on line 22 to processor 14, and $\phi_2$ delivered on line 24 to processor 16. Clock circuit 18 also creates a signal at twice the frequency of the incoming system clock signal on line 20 and delivers it on line 26 to latch 28 in pipeline memory 12. During phase one, processor 14 presents an address and provides control signals over line 30 to pipeline memory 12. During phase two, memory 12 provides the data on line 32 back to processor 14 (read), or the processor 14 supplies data (write). Also during phase two, processor 16 on line 34 requests an address and provides control signals and the data is returned (read) or supplied (write) to it in response thereto over line 36 during phase one of the next period of the system clock signal. Operating clocks 50 and 52 which may be independent of the access are provided to each processor 14 and 16 respectively.

Figure 2:
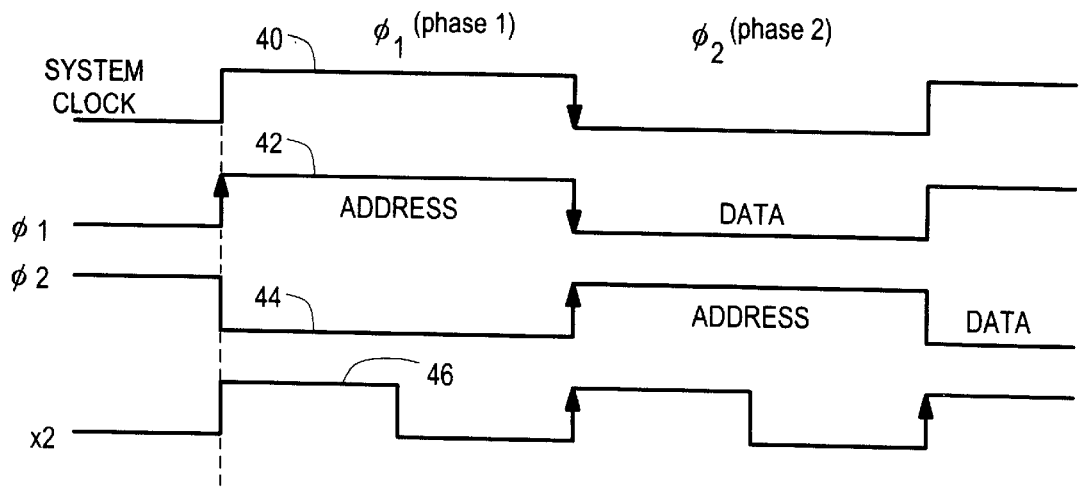
FIG. 2 is an illustration of the clock signals that occur at various points in FIG. 1.

This can be seen more readily with respect to the wave form shown in FIG. 2. There the system clock 40 which appears on line 20 is shown as having two phases: $\phi_1$ and $\phi_2$. In clock circuit 18 there are two clock signals developed from that: phase one signal 42 and the phase two signal 44, which is the inverse of the phase one signal 42. Signal 42 is actually a duplication of the system clock signal, in this case where the pipeline memory system is operating as a dual access system and there are but two processors 14 and 16 to deal with. The third clock signal delivered to pipeline memory 12 on line 26 appears as shown at 46 as occurring at twice the rate of the system clock signal 40. However, it should be understood that this is not operating the memory at twice the normal memory speed; rather, it is simply operating latch 28 to perform the pipelining function of pipeline memory 12. As the number of processors increases, the number of latches must also increase in order to adequately pipeline the requests and data inputs and outputs. The third clock signal need not be a separately created signal; it can be derived from the rising and falling edges of the original clock.

In order to expedite processing of the request by pipeline memory 12, the addresses from processors 1 and 2 are driven onto a common address bus. The address from processor 1 is driven in $\phi_2$ and is latched in 50, FIG. 3A, at the start of $\phi_1$. The address from processor 2 is driven in and is latched in 50 at the start of $\phi_2$. Thus the address decoder can immediately begin decoding the addresses at the start of $\phi_1$, and $\phi_1$. Latch 50 is clocked by the same 2× clock that drives the pipeline latch 28.

Figure 3A:
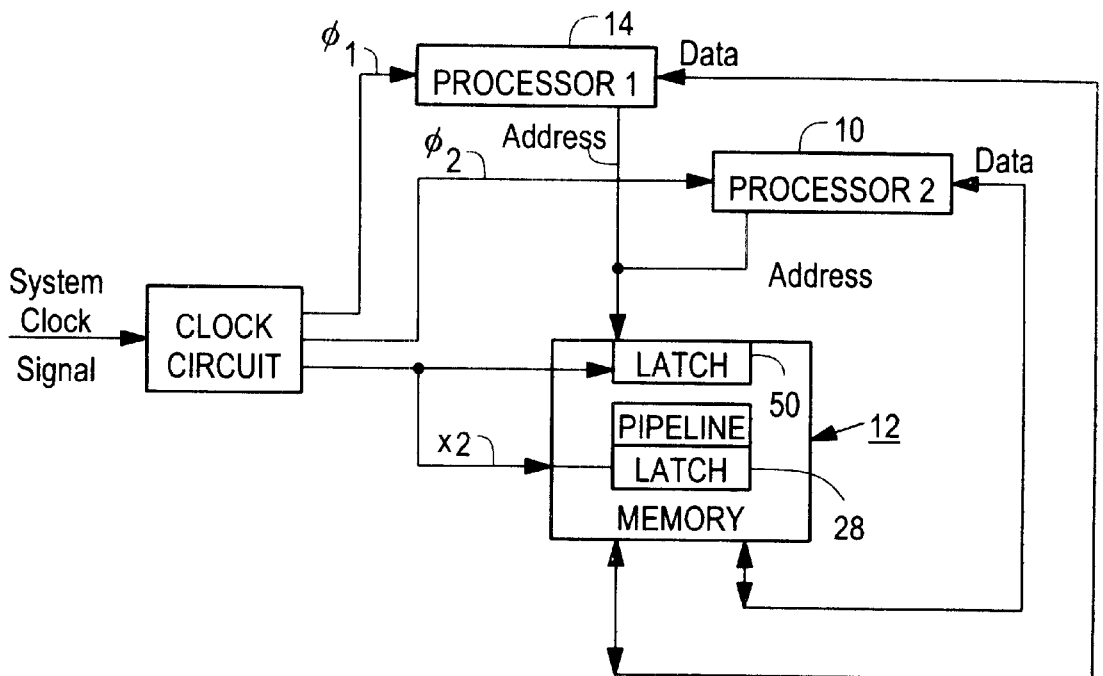
FIG. 3A is a more detailed block diagram of the system of FIG. 1 showing an additional holding latch which expedites the operation of the pipeline memory.
Figure 3B:
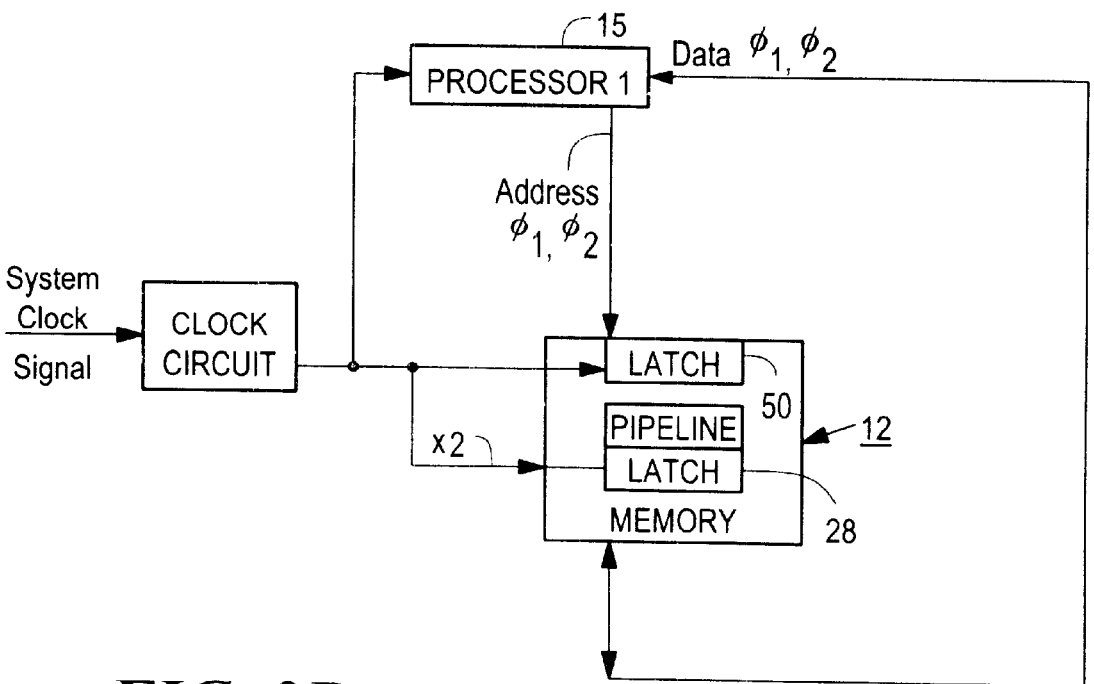
FIG. 3B is a more detailed block diagram of the system of FIG. 1 but only having one processor according to another embodiment of the subject invention in which the single processor uses two phases of the clock cycle.

FIG. 3B shows a single processor 15 to replace the two processors 14 and 10 of FIG. 3A. In this application single processor 15 issues two instructions and receives two data values per systemdock cycle. The processor is pipelined so that it is issuing a new address $\phi_1$, while it is receiving data from the address previously supplied in $\phi_1$. Similarly it issues an address in $\phi_2$ while it is receiving data from the address previously supplied in $\phi_2$.

This allows a single processor, with a pipelined access to memory 12 to access the pipelined memory 12 twice per cycle, thus achieving an overall performance doubling above a normal processor and memory without pipelines.

Figure 3C:
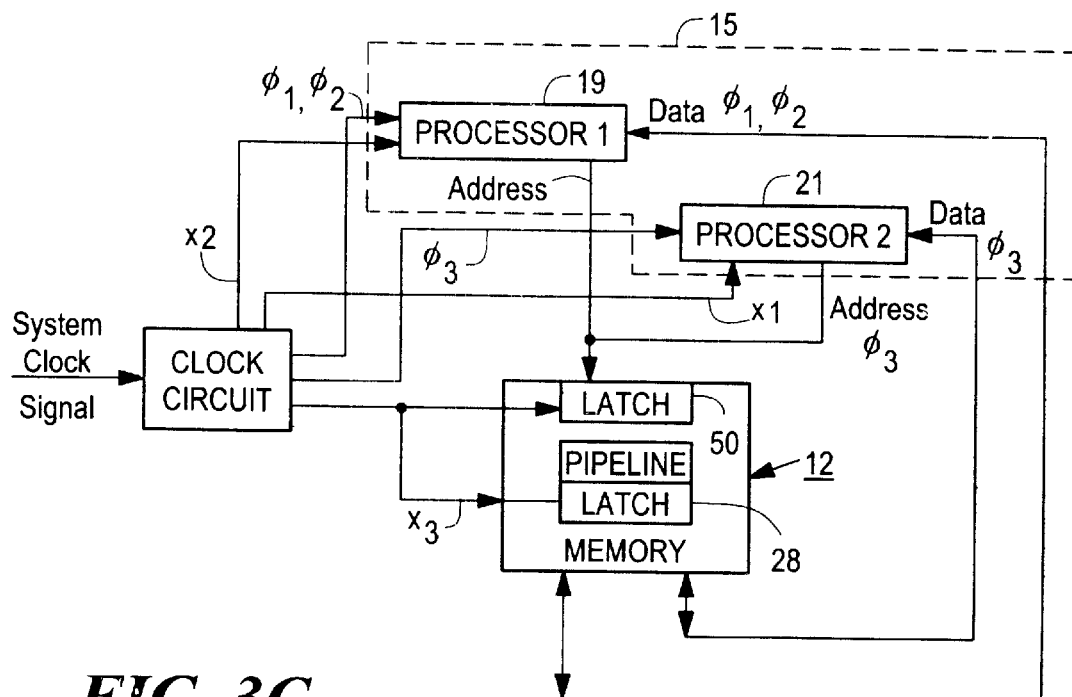
FIG. 3C is a block diagram of another embodiment of the subject invention including one processor using two phases of a clock cycle and another processor using a third phase of the clock cycle.

FIG. 3C shows an extensions of the idea of FIG. 3A wherein the system clock cycle is divided into three phases $\phi$, $\phi_2$, and $\phi_3$, to allow three accesses to the memory on each system clock cycle.

Processor means 15 including processor 17 and processor 21 operating such that processor 19 may use $\phi_1$ and $\phi_2$ in the manner described in FIG. 3A to access memory twice per cycle while processor 21 accesses the memory in the remaining phase, $\phi_3$. Note that processor 1 will probably, but not necessarily operate from a ×2 clock to allow it to process two memory accesses per cycle while processor 2 will probably but not necessarily operate from a ×1 clock to allow it to process one memory access per cycle.

Figure 3D:
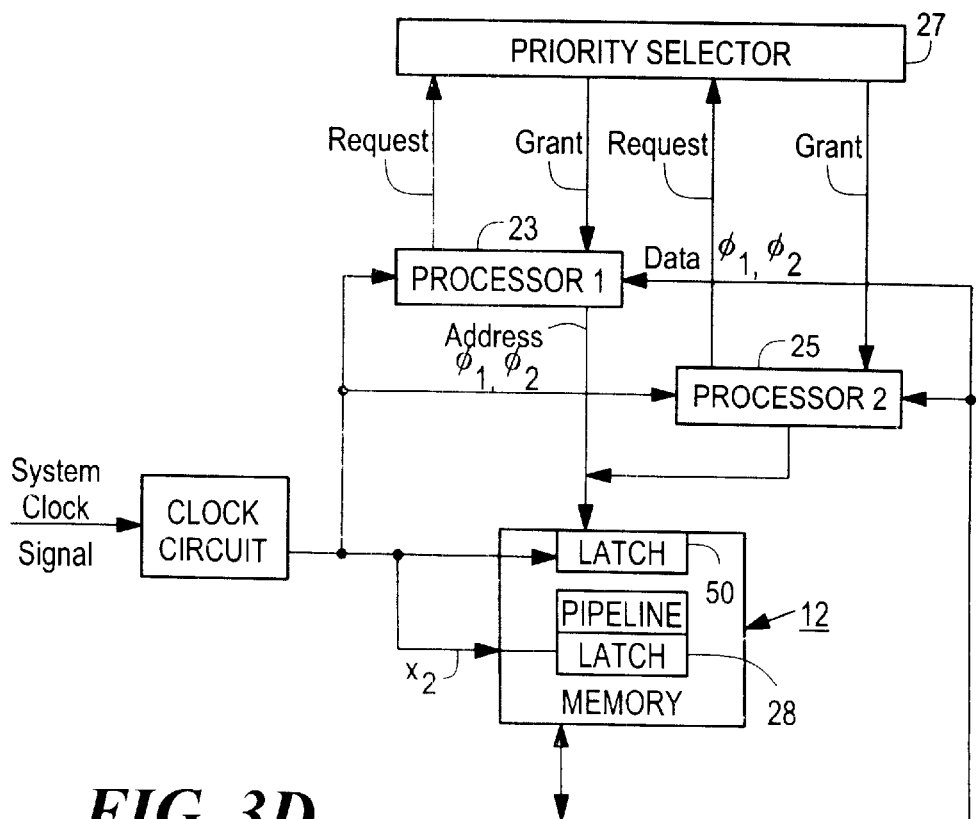
FIG. 3D is a block diagram of another embodiment of the subject invention in which multiple processors access memory by cycle stealing.

It is not always necessary to divide the memory period into more than two phases if another processor needs to access memory. FIG. 3D shows processor 23 that accesses the pipeline memory by pre-empting processor 25. This method is also known as "cycle stealing". Which processor may access the memory is determined by a priority selector 27.

Priority selector 27 determines which processor can have access to memory by asserting a grant signal. The access determination may be either "fairness" or strict priority.

Figure 4:
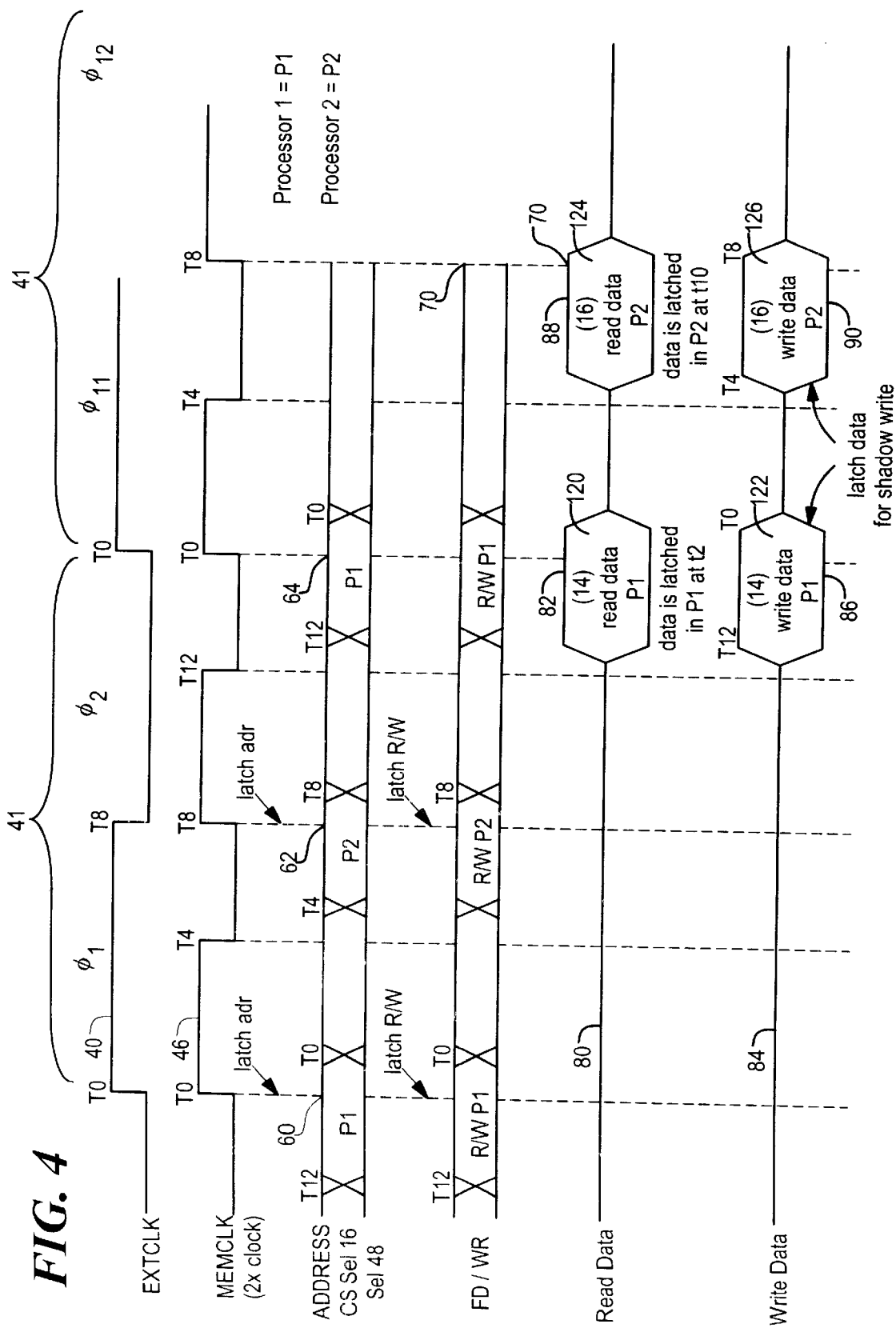
FIG. 4 is a timing diagram showing the sequence of occurrences with respect to the operation of the pipeline memory in FIGS. 1 and 3.

FIG. 4 is a detailed timing diagram showing the signals that occur at various points in FIG. 3A. As can be seen, system clock signal 40 has two phases, $\phi_1$ and $\phi_2$, which makeup the total clock period 41. The next clock period 41' includes phase $\phi_{11}$ and $\phi_{12}$, and so on. The double rate clock signal 46 driving latch 28 triggers latch 50 to store the incoming address request from processor 14 at time 60. During the first phase, $\phi_1$, ending at time 62, this address is decoded. In the second phase, ending at time 64, the decoded address is used to retrieve the data and return it on line 32 to processor 14. Simultaneously during phase $\phi_2$, beginning at time 62, latch 50 secures the address for processor 16 during the rest of phase $\phi_2$. The use of latch 50 forces the processors to have the address valid at the beginning of each phase, but this address can be removed (by the processors) immediately after the phase begins. Latch 50 in essence shifts the timing of address and data such that each processor supplies its address and gets its previous data in the same phase. (See FIG. 4.) This is completed at time 64 at the end of phase $\phi_2$ and the close of clock period 41. During phase $\phi_{11}$, of the next clock period 41' ending at time 70, the data is retrieved in accordance with the decoded address and returned to processor 16. Although in this particular explanation latch 28 is right in the middle of pipeline memory 12, dividing the address decode and the data retrieval functions, this is not a necessary limitation of the invention as one or more latches may be used to implement latch 28 and these may be used at various locations in the pipeline memory 12. Note that at time 62 latch 28 latches the decoded address of processor 14 in response to the address in latch 50. Thus latch 28 affects the pipelining function of memory 12 by permitting the memory to decode the address for one processor request held in latch 50 while simultaneously accessing the memory array with the decoded address held in latch 28.

Included in the address request on lines 30 and 34 from processors 14 and 16 are control signals which indicate whether there is information that has to be written into or read out of, or neither, of the decoded address. The read data waveform 80, FIG. 4, indicates that the data to be read or written is valid toward the end of $\phi_2$ for processor 14. If the data is to be read the waveform 80 indicates that the data to be read will be valid when time 64 is reached as indicated at read data 82. If the data is to be written into memory then waveform 84 indicates that the data is valid to write at 86. Similarly, the data valid indications 88 and 90 for microprocessor 16 indicate that the data is valid at time 70.

Figure 5:
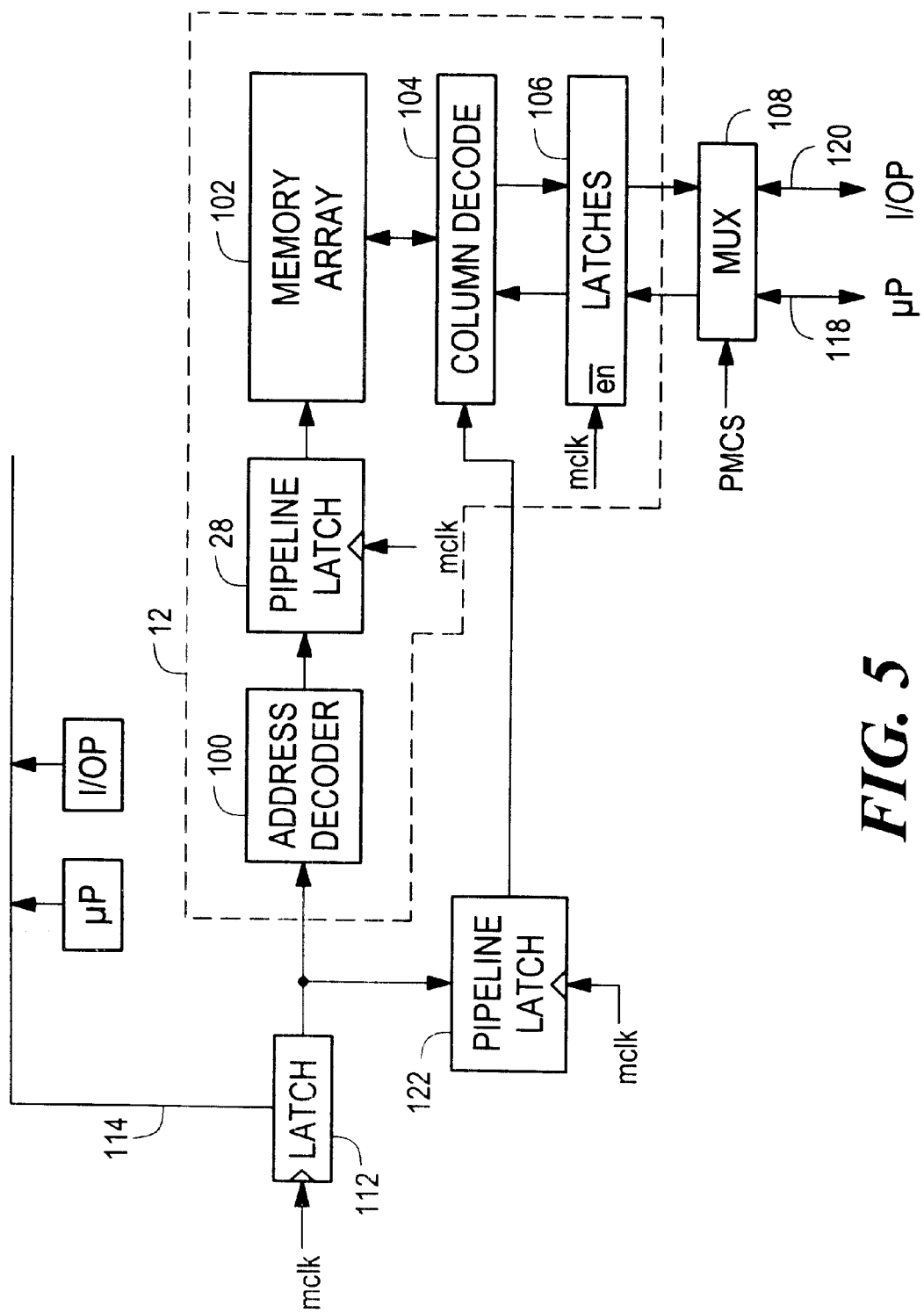
FIG. 5 is a more detailed block diagram of the pipeline memory of FIGS. 1 and 3A.

A more detailed implementation of pipeline memory 12, FIG. 5, shows that it includes an address decoder 100, latch 28, memory array 102, column decoder 104, and latches 106. There is a MUX 108 at the output. Assuming the two processors in this dual-access pipeline memory system include one microprocessor and one I/O processor, the address of each will be fed in on line 114 during each phase of the clock: drive processor 1 during $\phi_2$ and drive processor 2 during $\phi_1$. Latch 112 is a holding latch similar to latch 50 which holds the previous processor address request so that the new one is available for address decoder 100 immediately upon the beginning of the period. Latch 28 operates in conjunction with address decoder 100 and memory array 102 in the normal manner of pipeline memories. Column decode 104 receives the output data from memory array 102 and delivers it to latches 106 which are also anticipatory latches that maintain the output data at the ready condition for delivery to the requesting processor and the data to be written for delivery to the memory array. The data lines 118 and 120 return to the microprocessor and I/O processor, respectively, the data which they have requested. Data lines 118 and 120 may be time-shared in the same way as are the address lines. Latch 106 functions to maintain the data at the ready for delivery to the processor. It is this function that produces the overlapping sections 120, 122, 124 and 126 of waveform sections 82, 86, 88 and 90, respectively, indicating that the data is there and ready at the moment the processor is ready to receive or write the data. The control signals previously referred to which are delivered by the processor to the pipeline memory and part of the address are delivered over another latch 122 to column decode 104. Latch 122 operates to synchronize the operation of column decode 104 with the pipeline latch 28.

Figure 6A:
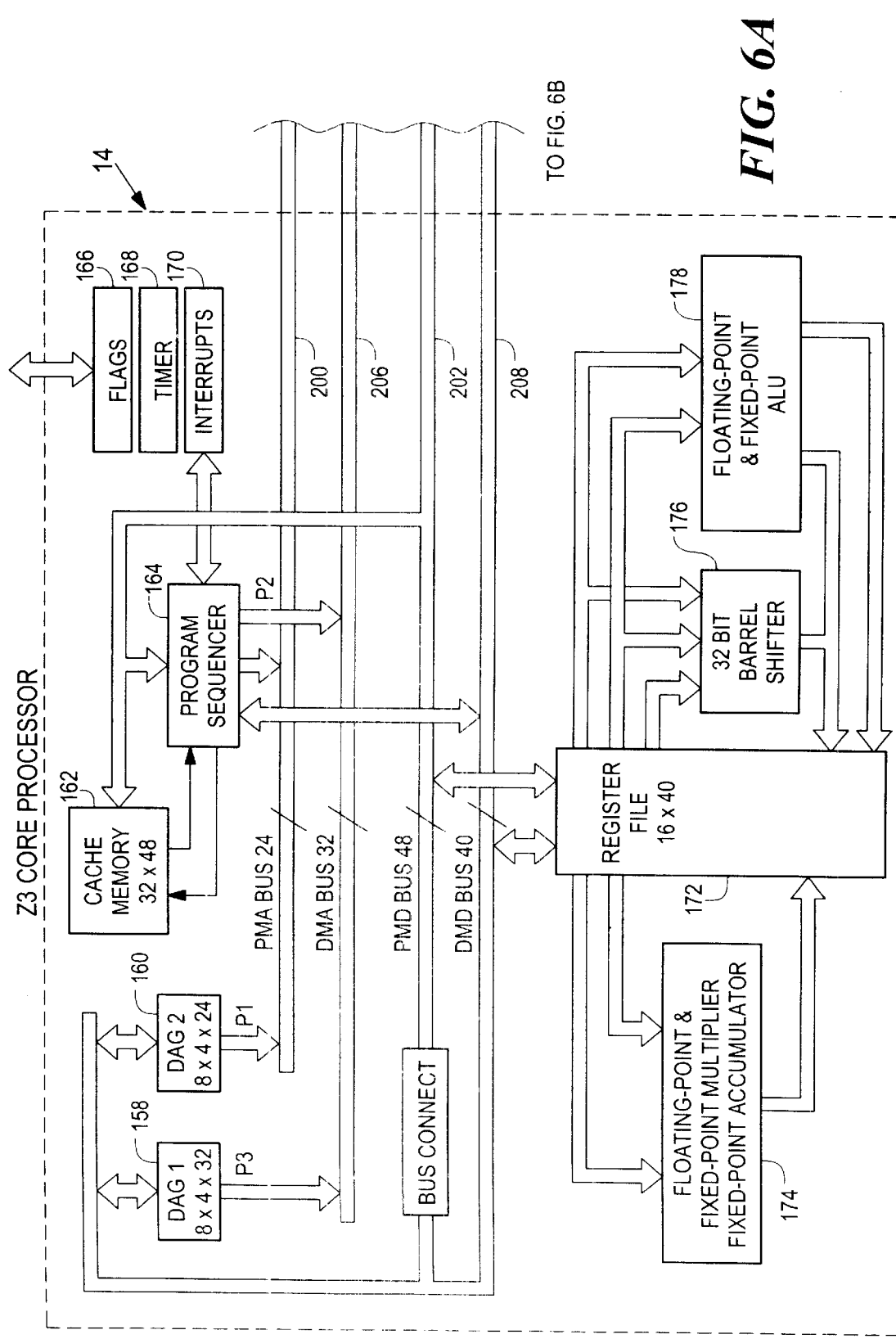
FIGS. 6A and B are a detailed block diagram of a specific implementation of the invention using a four-bank pipeline memory and a number of subprocessors in a microprocessor sharing dual data and program buses.

In one application, memory 12, FIGS. 6A and 6B, includes four memory banks 150, 152, 154 and 156, and processor 14 is a microprocessor which includes a data fetch unit data address generators 158 and 160, cache memory 162, and an instruction fetch unit, program sequencer 164. Microprocessor 14 also includes conventional flags 166, timers 168 and interrupts 170. There is also a register file 172, floating and fixed point multiplier and a fixed point accumulator 174, barrel shifter 176, and a floating point and fixed point arithmetic logic unit 178. The other processor, processor 16, is actually an I/O processor which includes I/O processor register 180, serial port 182, nibble port 184, and data memory address control 186. The external port 190 includes a pair of MUXes 192, 194 and an external port control 196. In this application data address generator 158 and 160 and program sequencer 164 each are considered a processor, although in this case they are actually subprocessors of microprocessor 14, so that there are four processors in the eyes of memory 12: data address generators 158 and 160, program sequencer 164, and I/O processor 16. In this application there are two bus pairs: the program address and the program memory data buses 200 and 202 are one pair, and the data memory address and data memory data buses 206 and 208 are the other pair.

In accordance with this invention, during phase one, data address generator 160 or program sequencer 164 can access the program memory bus pair 200 and 202. Also during phase one the data address generator 158 can access the data memory address pair 206, 208. During phase two, only I/O processor 16 accesses the memory banks of memory 12 via program memory address pair 200 and 202. If both the program sequencer 164 and data address generator 160 need to address the program memory address bus 200, 202, then one must access it in phase one of a first clock period and the other obtain its access during phase one of the next clock period.

Figure 7:
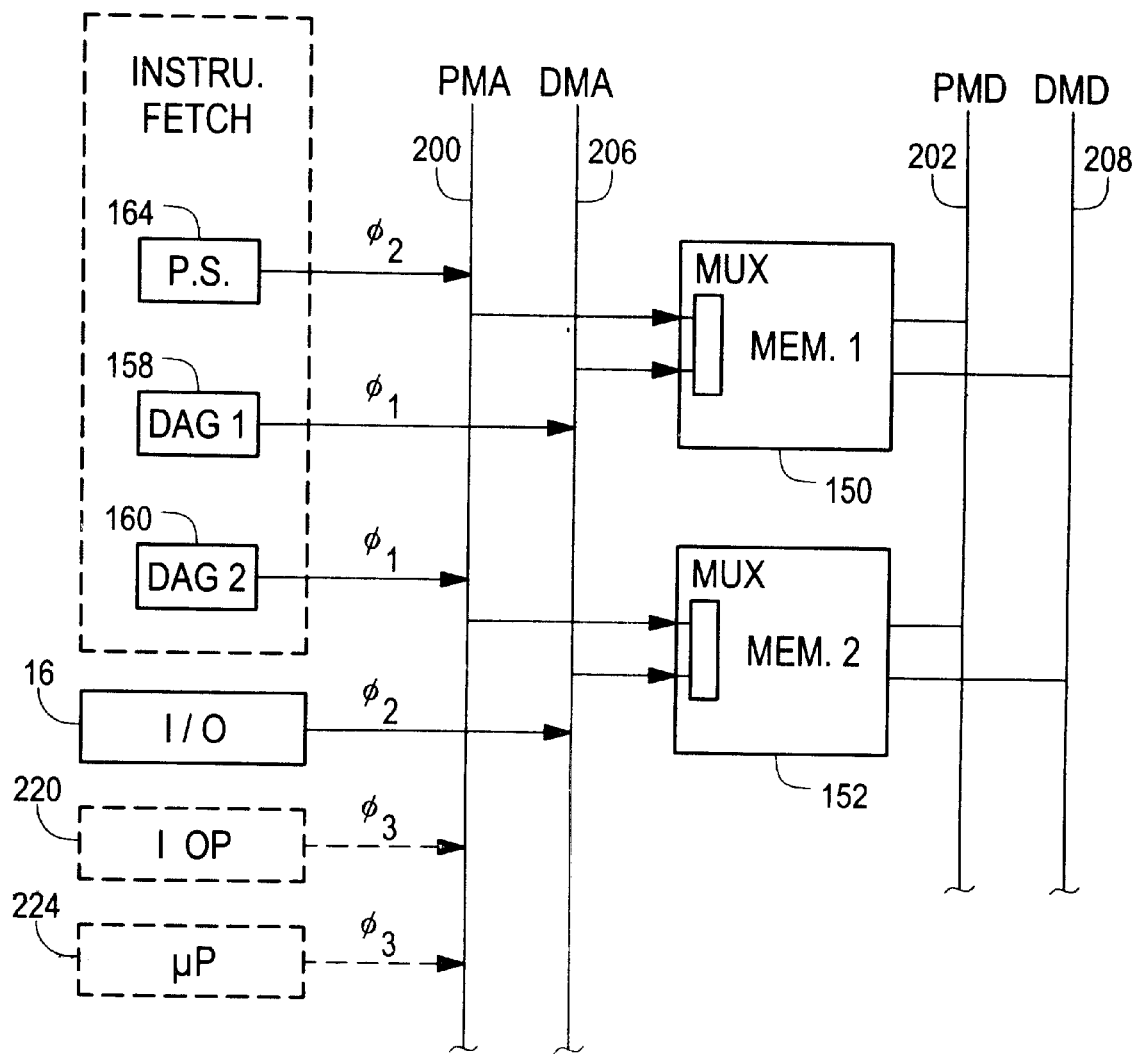
FIG. 7 is a illustration of yet a further improvement according to this invention in the operation of the system of FIGS. 6A and 6B.

An even more advantageous application of the invention to the system of FIGS. 6A and 6B can be seen with respect to FIG. 7, where the competition between program sequencer 164 and data address generator 160 for the program memory address pair 200 and 202 can be avoided by having data address generator 158 and 160 deliver their addresses to the two different buses 202 and 206 during the first phase, and then have the program sequencer 164 and I/O processor 16 deliver their address requests during the second phase to buses 200 and 206. This is achievable because program sequencer 164 is only loosely coupled to the data address generators 158 and 160. This underlies all applications of this invention as the phase distribution of the requests depends upon the ability of the various processors to work synchronously but out of phase with one another in order to obtain the multiple access to the pipeline memory without interrupting one another or requiring the memory to run at double or multiple speeds. With this implementation, as shown in FIG. 7, the bus pairs 200, 202 and 206, 208 are more efficiently used, data address generator 160 and program sequencer 164 are no longer in competition, and cache memory 162 can be eliminated. While thus far the illustrative examples have all been with respect to a dual access pipeline memory system, this is not a necessary limitation of the invention as the invention applies to any multi-access pipeline memory system as shown in phantom in FIG. 7 where an additional pair of processors such as I/O processor 220 and microprocessor 224 are shown utilizing program memory address bus 200 and data memory address bus 206 during a third phase, $\phi_3$, where of course the system clock signal has been divided into three phases or more, depending upon the number of processors to be accommodated and the number of buses available in conjunction with the pipeline memory.

Another application of this invention is for implementing instructions or data caches. In a cache memory system, when a cache miss occurs, a new line (8 or 16 words) must be loaded into the cache. Typically, the processor stops while this cache line is loaded. A dual phase memory may remove this dead time for sequential code as described below.

In a dual phase cache memory, one phase would be used for an access in the current cache line while the other phase would be used to load the next sequential cache line in anticipation of bringing in this next line . This is likely to happen since most code is sequential. Fetching the next line early has no impact on the performance at the current line.

Without the dual phase memory, the next line fill would have no benefit because the processor would be shut out while the line fill is occurring.

In FIG. 7, the I/O device 16, may in fact be doing the anticipatory line fill for the cache of either memory 1 or 2.

In the case of a non-sequential access (branches), the anticipated line fill should be aborted and the line fill should start again at the branch location and continue, model fashion for that line.

Therefore, although specific features of this invention are shown in some drawings and not others, this is for convenience only as some feature may be combined with any or all of the other features in accordance with the invention.

What is claimed is:

1. A method of operating two processors to access a pipeline memory with latch means and a memory array and interconnected with said processors in a system operated by a system clock signal, the method comprising:

dividing the system clock signal into two phases;

operating the first processor to issue addresses to the pipeline memory during one phase and to receive data from the pipeline memory in the same phase;

operating the second processor to issue addresses to the pipeline memory during said second phase; and operating the latch means of the pipeline memory at a frequency higher than the system clock signal and to hold the addresses issued by the first processor and the addresses issued by the second processor so that the pipeline memory can decode the addresses issued by the first processor while simultaneously accessing the memory array with decoded addresses from the second processor.

2. The method of claim 1 in which the latch means is operated at a frequency twice the system clock signal.

3. A method of operating a single processor to access a pipeline memory with latch means and a memory array in successive cycles, the method comprising:

dividing a clock signal into two phases;

operating the processor to issue an address to the pipeline memory during the first phase of a cycle and to issue an address to the pipeline memory during the second phase of the cycle;

operating the processor to receive data from the pipeline memory during the first phase of the cycle and to receive data from the pipeline memory in the second phase of the cycle; and operating the latch means of the pipeline memory at a frequency higher than the clock signal and to hold the address issued by the processor during the first phase of the cycle so the pipeline memory can decode, during the second phase of the cycle, the address issued in the first phase.

* * * * *